Feb. 2, 1960
W. H. PEIFER
2,923,157
LIQUID LEVEL GAUGE
Filed Jan. 3, 1956
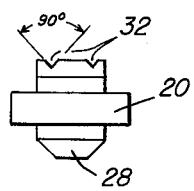
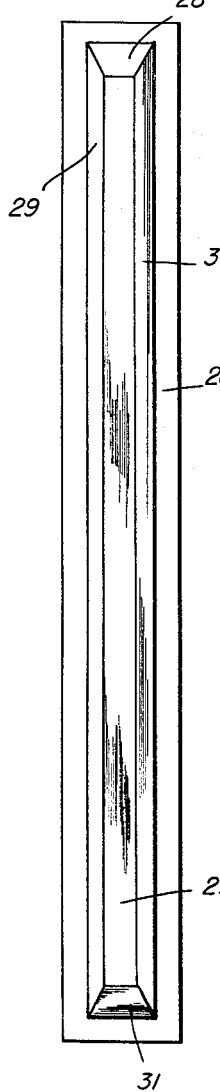
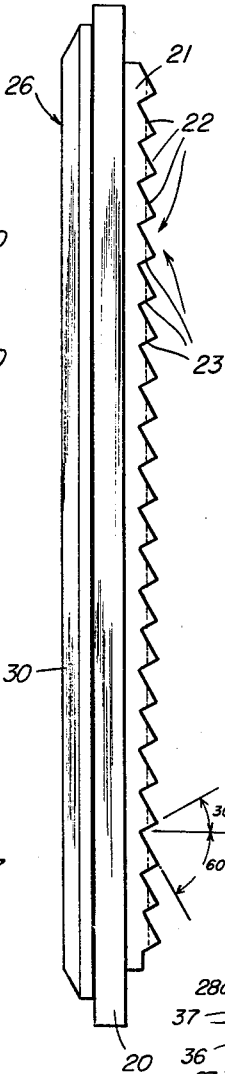
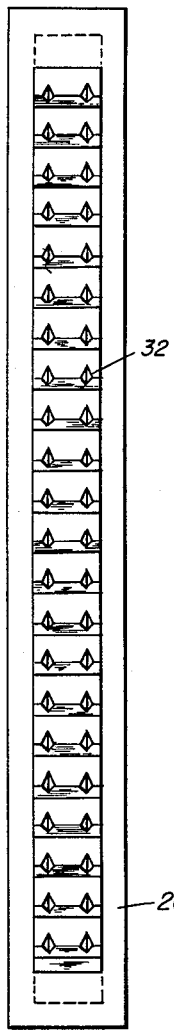
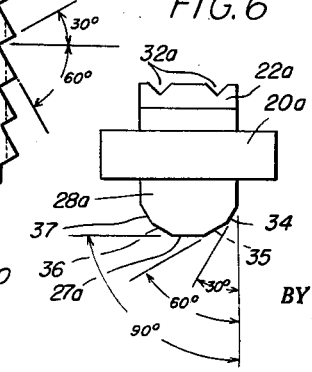
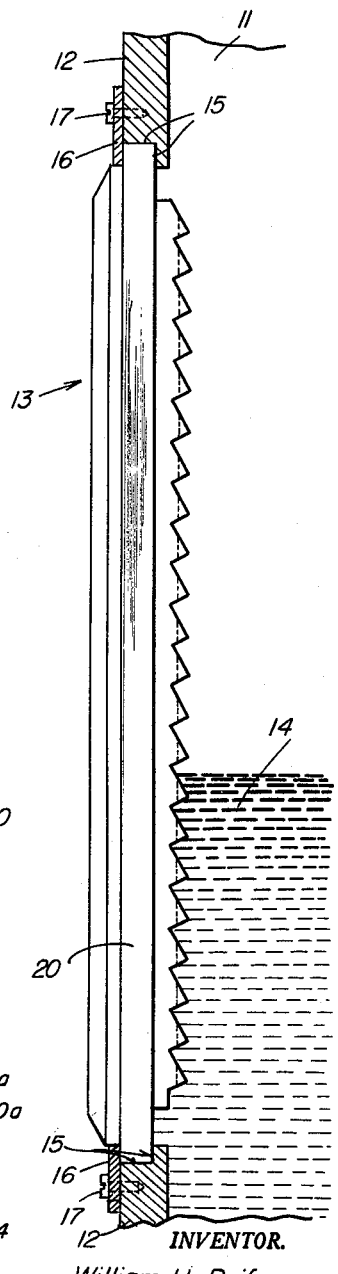
INVENTOR.
William H. Peifer
BY *W. O. Keith*
Attorney

United States Patent Office 2,923,157
Patented Feb. 2, 1960

2,923,157

LIQUID LEVEL GAUGE

William H. Peifer, New York, N.Y., assignor, by mesne assignments, to Wegner Machinery Corporation, Long Island City, N.Y., a corporation of New York Application January 3, 1956, Serial No. 556,867

6 Claims. (Cl. 73—327)

This invention is concerned with a liquid level gauge. More specifically, the invention contemplates a gauge of the window type which has special characteristics enabling it to be used with dark sticky liquids such as certain grades of fuel oil now being employed by various diesel engines. Also improved results may be had with lighter bodied and clear fluids.

It has been found that the ordinary liquid level gauge employing a visual indication of the level of the liquid, is rendered inoperative by reason of the use of relatively dark liquids which have characteristics causing the liquid to leave a film or coating over the glass of a gauge. Such coating tends to build up to such an extent that it is practically impossible to observe the level of the liquid within the container.

A window gauge according to this invention makes use of a well known property of certain transparent materials as related to the corresponding property of air which involves the indices of refraction thereof. The gauge window of this invention additionally employs certain features which create a successful window type gauge under adverse conditions.

Consequently, it is an object of this invention to provide an improved window type liquid level gauge which makes use of the properties of the window material such that total reflections of light are had above the liquid while no such total reflection takes place at and below the level of the liquid, even though the liquid is dark and tacky so that it sticks to the window.

Another object of this invention is to provide an improved liquid level window type gauge that makes use of a saw-toothed many faceted configuration on the inside thereof which contacts the liquid. Such saw-toothed configuration being so arranged that an optimum condition is had for creating bands, or areas, of total reflection of light transmitted through the window above the liquid; while such light is not so reflected but merely penetrates into the liquid at and below the level thereof.

Still another object of the invention is to provide an improved window type liquid level gauge which makes use of a plural faceted exterior surface in order to gain added light gathering qualities while at the same time reduce the surface reflection or glare from the window.

Briefly, the invention includes a liquid level gauge which comprises a jewel type window that extends longitudinally to include the full range of liquid level variations to be measured. The window is constructed of material having an index of refraction in the same range as that of the liquid. The invention also includes a many faceted interior surface on said window that is in direct contact with the liquid. The facets of this interior surface intersect in laterally extending lines to create horizontal bands of light above the surface of the liquid. The outside of the window has a plurality of plane surfaces at angles to one another for reducing glare and for admitting more light into said window.

Certain preferred embodiments of the invention are described below and illustrated in the drawings, in which:

Figure 1 shows a side elevation partly in cross section illustrating one manner of mounting the window of the gauge in a tank;

Figure 2 is a front elevation of one embodiment of the window;

Figure 3 is a side elevation of the same embodiment as Figure 2;

Figure 4 is a back or inside elevation of the same embodiment as Figure 2;

Figure 5 is a top or plan view of the same embodiment of the window; and

Figure 6 is a top or plan view of another embodiment of a window according to the invention.

Figure 1 shows a broken away view of a tank 11 which has a front or end wall 12 in which a transparent window 13 according to this invention, is mounted. The tank 11 contains a liquid 14 the level of which is to be measured by visual indication through the window 13. Wall 12 of the tank 11 has an opening which is rectangular in shape and has proper dimensions so as to closely fit the outside dimensions of the window 13. The edges of the opening in wall 12, have a notch 15 therein, to receive the body of the window 13. On the outside of the wall 12 there is a plate 16 which overlaps the edges of the window 13 and may be securely fastened to the wall 12 in any appropriate manner, such as by means of screws 17. It will be readily appreciated that the gauge may take other forms than that here illustrated (in Figure 1) as being a window directly mounted in one wall of a liquid containing tank. For example, the window 13 could be mounted in a tube or some other type of liquid column container, which would be connected at its upper and lower extremities with the body of liquid, the level of which is being measured.

Referring to Figures 2 through 5, the various aspects of one configuration that may be employed for window 13 will be made clear. The window is made up of a rectangular body portion 20 which has a predetermined thickness at the edges thereof as shown in Figures 3 and 5. On the inside surface of the body portion 20 (as mounted for use, e.g. in accordance with Figure 1) there is an integral, many faceted raised strip 21, which is made of the same transparent material as the body portion 20. This strip 21 comes into direct contact with the liquid 14 when mounted for use. The strip 21 has a many faceted surface that is saw-toothed in configuration when viewed from the side, e.g. as illustrated in Figures 1 and 3. This saw-toothed surface is made up of a large number of parallel facets 22, which have the plane thereof set at an angle of 60 degrees to a perpendicular relative to the plane of the entire window 13. This angular construction is indicated in Figure 3. The other surface of each tooth in the saw-toothed configuration, is made up of one of many facets 23, which lie parallel to one another and at right angles to facets 22.

These facets 22 and 23 are all so arranged as to cause the lines of intersection, i.e. the points of the teeth, to lie laterally across the raised strip 21, as best observed in Figure 4. Each of the facets 23 lies in a plane which is set at 30 degrees to the perpendicular relative to the plane of the window 13. This arrangement of facets 22 and 23 provides for optimum light reflections and maximum reading angles for the gauge. Total reflection of the light passing through the window 13 above the liquid 14 causes bright bands of reflected light, while below the liquid the light largely penetrates, or is absorbed by, the liquid without reflection.

In addition to the facets 22 and 23, and in order to aid in the effect gained above the level of the liquid; there are a plurality of notches 32. These notches are formed by making longitudinal cuts having V-shaped sides with the sides lying at right angles to one another as indicated in Figure 5. The effect of these notches 32 is to add facets on the inside surface of the window in contact with the liquid so that there are additional surfaces to give total reflection effects above the level of the liquid, especially when the gauge is viewed from the sides.

On the outside or front surface of the window 13 there is a raised portion 26 that is an integral part of the body 20, and is constructed of the same material. This raised portion 26 includes a flat face 27 which is parallel to the plane of the window 13, and which has an area less than the maximum exposed area of the window 13 (when mounted for use). Around the edges of the face surface 27 there are a plurality of facets 28, 29, 30 and 31. Facets 28 and 31 are at the top and bottom ends respectively, of the face 27, when the window is mounted for use. Facets 29 and 30 lie along the sides of the face 27. Various angles for the facets 28 through 31 may be employed, but it is preferred to use angles such as those illustrated wherein the facets 28 and 31 lie at an angle of 60 degrees to a perpendicular from the plane of the window 13, while facets 29 and 30 lie at an angle of 45 degrees to a perpendicular to the plane of the window 13.

Figure 6 shows another embodiment. The only changes have to do with the number and arrangement of the facets on the outside or front surface of the window. Consequently, the same reference numbers are used with a small sub "a," for the corresponding elements. It will be observed that the number of side facets has been doubled so that there are two facets 34 and 35 instead of the single side facet 30 of the other embodiment. Likewise, there are two side facets 36 and 37 symmetrically placed on the other side of the flat face facet 27a, which is relatively narrower than face facet 27 in order to accommodate the additional side facets. As indicated in Figure 6 the preferred angles for facets 34, 35 and 37, 36 are thirty degrees and sixty degrees to a perpendicular to the plane of the window 13.

In operation the gauge acts to allow light, which is falling from general illumination onto the outside (including face 27 and facets 28 through 31 of the window 13—or face 27a and facets 28a plus 34—37) to pass inward through the transparent material of which the window 13 is made. Then by reason of the construction of the many faceted interior surface, and by reason of the fact that the transparent material used for window 13 is one which has an index of refraction in the same range as the index of refraction of the liquid 14; much of the light which penetrates the window above the level of the liquid 14 is returned by total reflection because of well known principles involving the refraction indices of the material of window 13 and the air, or other gas space, lying above the liquid 14. This refractive action causes the bending of the light rays upon their tending to leave the material of window 13, to a sufficient extent to give total reflection thereof from facets 22 and facets 23 at right angles thereto, as well as the additional facets of notches 32, so as to be returned out through the front of the window 13 again. However, at and below the surface of the liquid 14, the light rays during the course of passing through the window 13, do not encounter the substantial change in index of refraction between that of the material of window 13 and that of the liquid 14. Therefore, the rays do not become totally reflected to any appreciable extent, but merely pass on into the liquid.

For this reason the gauge will readily show what the level of the liquid is, irrespective of a film which will tend to accumulate on the inside surface of the window 13 above the level of the liquid 14. This is particularly important where the liquid is a dark sticky one which will leave a substantial film on the inside surfaces of the window 13. In this regard, it is pointed out that the total reflection action described above, still takes place in spite of the film of liquid which has clung to the many faceted inside surface of the window 13 so long as the light can pass through such film. This is because the film merely adds a certain additional amount of material for the light rays to penetrate before the same substantial difference in indices of refraction is encountered which produces total reflection effects as before.

An additional effect of the inside facets is that created by the sharp intersection lines and points thereof. These tend to cut through and thus reduce the film formation so that the effectiveness of the gauge will not be adversely affected.

It should also be noted that the outside surface of the window 13, by reason of its plurality of facets, is able to gather more light than would otherwise be the case. This is true because whatever the direction from which the maximum light comes, it will tend to encounter a surface that is more nearly perpendicular to these rays of light. Consequently, these rays may penetrate more readily without being reflected from the outside surface of the window, even though such surface has become somewhat coated with dust or the like. Furthermore, this same construction of a plurality of facets on the outside surface of the window, eliminates to a large extent a condition where the glare or surface reflection from the window would render it entirely unreadable. This latter is true because such glare can only be had from one facet at a time, and the remaining facets will be without glare so that the gauge may easily be read.

It is pointed out that by reason of the arrangement of the intersecting lines and points between the many facets 22 and 23 as well as the sides of notches 32 on the inside of the gauge, the liquid tends to drain off from the sharp edges and points more readily so that the relative angular relationship between these facets is maintained by the surface of the liquid film. Thus the effect of the gauge is to produce jewel-like brilliance above the level of the liquid 14 while below the level all such brilliance is removed and only a dull even lighted appearance is had. Of course the plural faceted front surface is an important factor in creating the jewel-like effect above the liquid level.

While particular embodiments of the invention have been illustrated and described in accordance with the applicable statutes, this is not to be taken as in any way limiting the invention, but merely as being descriptive thereof.

It is claimed:

1. A liquid level gauge for dark sticky liquids comprising a jewel type window extending longitudinally to include the full range of liquid level variations to be measured, said window being constructed of material having an index of refraction in the same range as that of the liquid, a many faceted interior surface on said window in direct contact with the liquid, said facets intersecting in laterally extending lines to create horizontal bands of light above the surface of the liquid, the planes of half of said facets being parallel to one another and lying at an angle of thirty degrees to the perpendicular with the plane of said window, the planes of the other half of said facets being parallel to one another and lying at an angle of sixty degrees to the perpendicular with the plane of said window, the outside of said window having a flat surface plus sloping intersecting surfaces joining the edges thereof with the edges of the window.

2. In a visual type liquid level gauge, a window comprising a rectangular body of clear light transmitting material having an index of refraction in the same range as that of the liquid the level of which is being measured, said body having an inside surface for contacting said liquid and an outside surface for observing the level of the liquid therethrough, a plurality of facets on said inside surface forming lateral line intersections with one another, adjacent pairs of said facets being arranged in a saw-toothed configuration and having the surfaces of said pairs of facets lying at thirty and sixty degrees relative to a perpendicular to the plane of said window, said outside surface including a flat facet raised from the window level and having a rectangular area less than the area of said window, and additional flat facets on the outside surface adjoining the edges of said raised flat facet with the corresponding edges of said window to provide superior light gathering and glare reducing effects.

3. In a visual type liquid level gauge, a window comprising a rectangular body of clear light transmitting material having an index of refraction in the same range as that of the liquid the level of which is being measured, said body having an integral raised inside surface for contacting said liquid, an integral raised outside surface for admitting light therethrough for observing the liquid level, and a laterally extending edge around all sides thereof to facilitate mounting of the window; a plurality of facets on said inside surface forming lateral line intersections with one another which lie at right angles to the longitudinal dimension of said body; adjacent pairs of said facets being arranged in a saw-tooth configuration and having the surfaces of said pairs of facets lying at thirty and sixty degrees relative to a perpendicular to the plane of said window; a plurality of notches in the intersection lines of said saw-tooth facets; said outside surface including a flat facet raised from the window level and having a rectangular area less than the area of said window, additional flat facets on the outside surface adjoining the edges of said raised flat facet with the corresponding edges of said window to provide superior light gathering and glare reducing effects; said last named additional facets including a facet at each end of the body lying at an angle of sixty degrees to the perpendicular to the plane of said window, and a pair of facets along each side of the body lying at angles of thirty and sixty degrees to the perpendicular to the plane of said window.

4. In a visual type liquid level gauge, a window comprising a rectangular body of clear light transmitting material having an index of refraction in the same range as that of the liquid the level of which is being measured, said body having an integral raised inside surface for contacting said liquid, an integral raised outside surface for admitting light therethrough for observing the liquid level, and a laterally extending edge around all sides thereof to facilitate mounting of the window; a plurality of facets on said inside surface forming lateral line intersections with one another which lie at right angles to the longitudinal dimension of said body; adjacent pairs of said facets being arranged in a saw-tooth configuration and having the surfaces of said pairs of facets lying at thirty and sixty degrees relative to a perpendicular to the plane of said window; a plurality of notches in said saw-tooth lateral line intersections to provide additional facets on the inside surface; said outside surface including a flat facet raised from the window level and having a rectangular area less than the area of said window, additional flat facets on the outside surface adjoining the edges of said raised flat facet with the corresponding edges of said window to provide superior light gathering and glare reducing effects; said last named additional facets including a facet at each end of the body lying at an angle of sixty degrees to the perpendicular to the plane of said window, and a facet along each side of the body lying at an angle of forty-five degrees to the perpendicular to the plane of said window.

5. In a visual type liquid level gauge, a window comprising a rectangular body of clear light transmitting material having an index of refraction in the same range as that of the liquid the level of which is being measured, said body having an integral raised inside surface for contacting said liquid, an integral raised outside surface for admitting light therethrough for observing the liquid level, and a laterally extending edge around all sides thereof to facilitate mounting of the window; a plurality of facets on said inside surface forming lateral line intersections with one another which lie at right angles to the longitudinal dimension of said body; adjacent pairs of said facets being arranged in a saw-tooth configuration and having the surfaces of said pairs of facets lying at thirty and sixty degrees relative to a perpendicular to the plane of said window; a plurality of notches in said saw-tooth lateral line intersections to provide additional facets on the inside surface, said notches having their sides lying at right angles to one another; said outside surface including a flat facet raised from the window level and having a rectangular area less than the area of said window, additional flat facets on the outside surface adjoining the edges of said raised flat facet with the corresponding edges of said window to provide superior light gathering and glare reducing effects; said last named additional facets including a facet at each end of the body lying at an angle of sixty degrees to the perpendicular to the plane of said window, and a facet along each side of the body lying at an angle of forty-five degrees to the perpendicular to the plane of said window.

6. In a visual type liquid level gauge, a window comprising a rectangular body of clear light transmitting material having an index of refraction in the same range as that of the liquid the level of which is being measured, said body having an integral raised inside surface for contacting said liquid, an integral raised outside surface for admitting light therethrough for observing the liquid level, and a laterally extending edge around all sides thereof to facilitate mounting of the window; a plurality of facets on said inside surface forming lateral line intersections with one another which lie at right angles to the longitudinal dimension of said body; adjacent pairs of said facets being arranged in a saw-tooth configuration and having the surfaces of said pairs of facets lying at thirty and sixty degrees relative to a perpendicular to the plane of said window, a plurality of notches in said saw-tooth lateral line intersections to provide additional facets on the inside surface, said notches having their sides lying at right angles to one another, said sides of the notches forming an angle of forty-five degrees with a perpendicular to the plane of the window; said outside surface including a flat facet raised from the window level and having a rectangular area less than the area of said window, additional flat facets on the outside surface adjoining the edges of said raised flat facet with the corresponding edges of said window to provide superior light gathering and glare reducing effects; said last named additional facets including a facet at each end of the body lying at an angle of sixty degrees to the perpendicular to the plane of said window, and a facet along each side of the body lying at an angle of forty-five degrees to the perpendicular to the plane of said window.

References Cited in the file of this patent

UNITED STATES PATENTS

| 1,087,466 | Sargent | Feb. 17, 1914 |
| 1,488,403 | Macbeth | Mar. 25, 1924 |
| 2,314,761 | Bochonok | Mar. 23, 1943 |
| 2,533,578 | Gomersall | Dec. 12, 1950 |

FOREIGN PATENTS

| 567,983 | France | Sept. 14, 1923 |